(12) United States Patent
Jiang et al.

(10) Patent No.: US 11,371,241 B2
(45) Date of Patent: Jun. 28, 2022

(54) DAMPER FOR ENERGY DISSIPATION

(71) Applicant: CHANGSHA UNIVERSITY OF SCIENCE & TECHNOLOGY, Hunan (CN)

(72) Inventors: Youbao Jiang, Changsha (CN); Wenhui Luo, Changsha (CN); Lei Wang, Changsha (CN); Zhi Liu, Changsha (CN); Hao Zhou, Changsha (CN); Wei Kang, Changsha (CN)

(73) Assignee: CHANGSHA UNIVERSITY OF SCIENCE & TECHNOLOGY, Changsha (CN)

( * ) Notice: Subject to any disclaimer, the term of this patent is extended or adjusted under 35 U.S.C. 154(b) by 0 days.

(21) Appl. No.: 17/107,039

(22) Filed: Nov. 30, 2020

(65) Prior Publication Data

US 2021/0095463 A1 Apr. 1, 2021

Related U.S. Application Data

(63) Continuation of application No. PCT/CN2020/095158, filed on Jun. 9, 2020.

(30) Foreign Application Priority Data

Sep. 27, 2019 (CN) .............................. 201910922631

(51) Int. Cl.
*E04B 1/98* (2006.01)
*E04H 9/02* (2006.01)
*F16F 7/00* (2006.01)

(52) U.S. Cl.
CPC ............... *E04B 1/98* (2013.01); *E04H 9/021* (2013.01); *F16F 7/00* (2013.01); *F16F 2238/04* (2013.01)

(58) Field of Classification Search
CPC ........... F16F 7/00; F16F 2238/04; F16F 7/128
See application file for complete search history.

(56) References Cited

U.S. PATENT DOCUMENTS

2021/0310239 A1* 10/2021 Montgomery ........ E04H 9/0215

FOREIGN PATENT DOCUMENTS

| CN | 101173535 A | 5/2008 |
|---|---|---|
| CN | 103195184 A | 7/2013 |
| CN | 105926794 A | 9/2016 |
| CN | 107035018 A | 8/2017 |
| CN | 208594649 U | 3/2019 |
| CN | 109958208 A | 7/2019 |
| CN | 109989610 A | 7/2019 |

(Continued)

*Primary Examiner* — Babajide A Demuren

(57) ABSTRACT

A damper for energy dissipation, including a core plate, at least four restrain plates and at least four connecting plates. The connecting plates are provided on two ends of the core plate, and the restrain plates are provided on middle of the core plate. The core plate is provided with a first hole, a second hole and a third hole. The connecting plate includes a first plate body and a second plate body connected with an end thereof. A first fastener passes through the first hole to connect the first plate body with the core plate. A second fastener passes through the second hole to connect the second plate body with the core plate. A third fastener passes through the third hole to connect the restrain plate with the core plate. The second plate body is located between two restrain plates.

7 Claims, 15 Drawing Sheets

(56) References Cited

FOREIGN PATENT DOCUMENTS

| | | | |
|---|---|---|---|
| CN | 110629899 | A | 12/2019 |
| CN | 112575919 | A * | 3/2021 |
| KR | 101527600 | B1 | 6/2015 |
| KR | 101539577 | B1 * | 7/2015 |
| KR | 101655743 | B1 * | 9/2016 |
| WO | 2019059576 | A1 | 3/2019 |

* cited by examiner

DAMPER FOR ENERGY DISSIPATION

CROSS-REFERENCE TO RELATED APPLICATIONS

This application is a continuation of International Patent Application No. PCT/CN2020/095158, filed on Jun. 9, 2020, which claims the benefit of priority from Chinese Patent Application No. 201910922631.1, filed on Sep. 27, 2019. The content of the aforementioned applications, including any intervening amendments thereto, is incorporated herein by reference in its entirety.

TECHNICAL FIELD

The present disclosure relates to a system for building structures, and more particularly to a damper for energy dissipation.

BACKGROUND

Earthquake occurs more and more frequently around the world. Due to the considerable impact on the building structures, the earthquake will not only impede the growth of the national economy but also seriously threaten the personal safety. Thus, extensive researches have been conducted in the civil engineering on how to construct an earthquake-resistant building. Ductility design and damping-isolating design are mostly adopted in the existing anti-seismic structures, where the ductility design usually dissipates energy through plastic hinges, which will be irreversibly damaged after an earthquake. By contrast, the damping design can dissipate energy through an energy-dissipation apparatus, and thus has desired repairability. The energy-dissipation apparatus has been extensively studied and widely used in the practical engineering, for example, the bucking-restrained brace (BRB) has been applied in the frame construction and the laminated rubber bearings between bridge griders and piers, which both play a significant role in dissipating seismic energy. In the practical application, a damper for energy dissipation will absorb the seismic energy, and thus the energy-dissipating capacity is closely associated with its seismic performance. However, most of the existing dampers have a limited energy dissipation capacity.

SUMMARY

In order to overcome the above-mentioned defects in the prior art, the disclosure provides a damper for energy dissipation, which can help the beam-column and pier connections dissipate seismic energy, facilitating the post-earthquake restoration of related structural members.

The technical solutions of the disclosure are shown as follows.

The disclosure provides a damper for energy dissipation, comprising:

a core plate;

at least four restrain plates; and at least four connecting plates;

wherein the at least four connecting plates are provided on two ends of the core plate, respectively; and the at least four restrain plates are provided on a middle of the core plate;

the core plate is provided with a first connecting hole, a second connecting hole and a third connecting hole; each of the at least four connecting plates comprises a first plate body and a second plate body connected to an end of the first plate body; a first fastener is configured to pass through the first connecting hole to connect the first plate body with the core plate; a second fastener is configured to pass through the second connecting hole to connect the second plate body with the core plate; a third fastener is configured to pass through the third connecting hole to connect each of the at least four restrain plates with the core plate; the second plate body is located between two opposite restrain plates; and symmetrical inclined gaps are provided between the at least four restrain plates and the at least four connecting plates;

the at least four connecting plates are slidable with respect to the core plate under an external force; and the at least four restrain plates are slidable with respect to the core plate to restrain an out-of-plane deformation of the core plate.

In some embodiments, the first connecting hole is a round hole; the second connecting hole and the third connecting hole are elongated holes; an extension direction of the second connecting hole is the same as that of the third connecting hole.

In some embodiments, the first fastener, the second fastener and the third fastener are all a bolt.

In some embodiments, an inner surface of each of the at least four restrain plates and an inner surface of the second plate body are both coated with a layer of a non-cohesive material.

In some embodiments, four restrain plates and four connecting plates are provided; two of the four connecting plates are symmetrically arranged at two ends of a side of the core plate; the other two of the four connecting plates are symmetrically arranged at two ends of the other side of the core plate; the two of the four connecting plates at one side of the core plate and the other two of the four connecting plates at the other side of the core plate are provided in mirror symmetry; two of the four restrain plates are symmetrically arranged at a middle of one side of the core plate; the other two of the four restrain plates are symmetrically arranged at a middle of the other side of the core plate; and the two of the four restrain plates at one side of the core plate and the other two of the four restrain plates at the other side of the core plate are provided in mirror symmetry.

In some embodiments, a longitudinal section of each of the at least four restrain plates is of an isosceles trapezoid shape; a length direction of a bottom surface of each of the at least four restrain plates is parallel to a length direction of the core plate; two inclined planes are respectively provided at two sides of the first plate body, and are parallel to waist surfaces of the two opposite restrain plates, respectively; and a gap is provided between each of the inclined planes and a waist surface of the corresponding restrain plate.

In some embodiments, the core plate is an energy-dissipation steel plate, and the at least four restrain plates are made of steel.

Compared to the prior art, the disclosure has the following beneficial effects.

In the damper provided herein, the restrain plates are configured to be slidable with respect to a core plate, so that the restrain plates can play a role in restraining the out-of-plane deformation of the core plate.

Moreover, the provision of symmetrical inclined gaps between the connecting plate and the restrain plate provides the core plate with a good deformability, and when the core plate is subjected to an axial pressure, a buckling is less likely to happen between the gaps.

DETAILED DESCRIPTION OF EMBODIMENTS

The principles and features of the disclosure will be further illustrated in detail below with reference to the accompanying drawings. Provided below are merely preferred embodiments, which are only illustrative of the disclosure and not intended to limit the disclosure.

Embodiments of the disclosure are shown in FIGS. 1-7.

Figure 1:
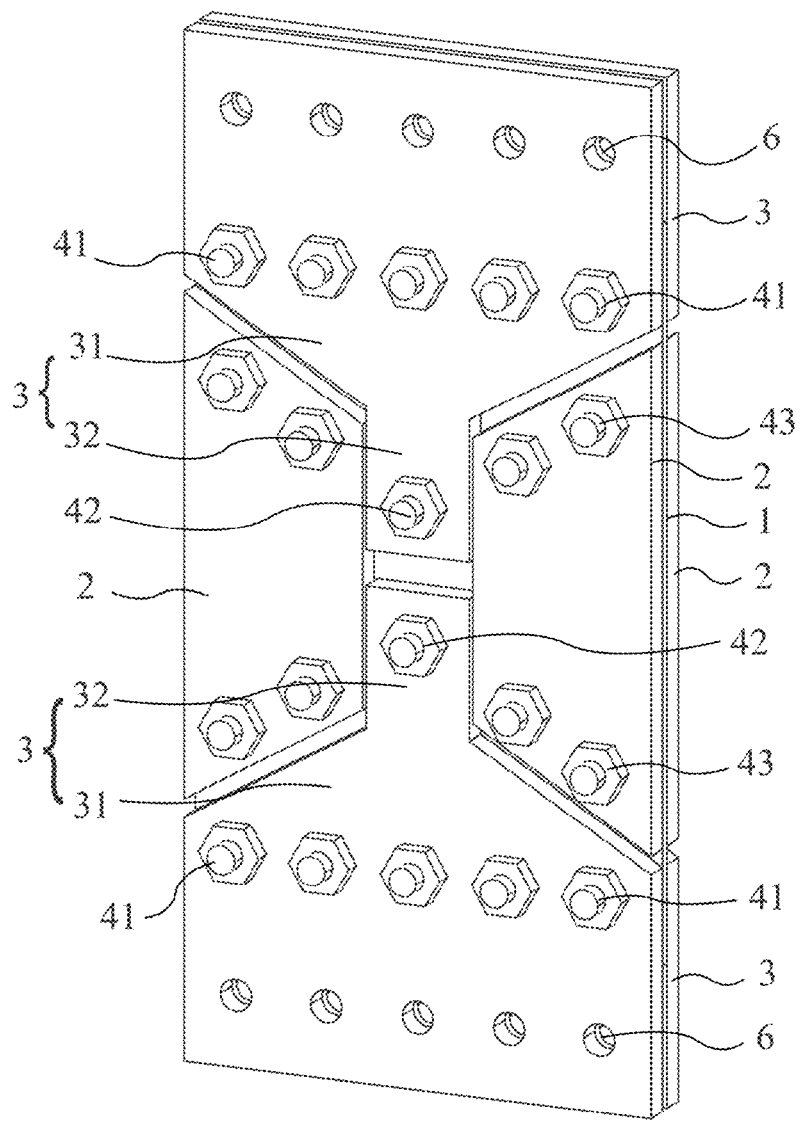
FIG. 1 schematically depicts a structure of a damper for energy dissipation according to an embodiment of the disclosure.

As shown in FIG. 1, a damper for energy dissipation includes a core plate 1, four restrain plates 2 and four connecting plates 3. The four connecting plates 3 are arranged at two ends of the core plate 1, where two connecting plates 3 are symmetrically arranged at two ends of a side of the core plate 1, and the other two connecting plates 3 are symmetrically arranged at two ends of the other side of the core plate 1. The connecting plates 3 on two sides of the core plate 1 are arranged in mirror symmetry. The four restrain plates 2 are arranged on a middle of the core plate 1, where two restrain plates 2 are arranged at a middle of one side of the core plate 1, and the other two restrain plates 2 are arranged at a middle of the other side of the core plate 1. The restrain plates 2 on two sides of the core plate 1 are arranged in mirror symmetry. At the same side of the core plate 1, a second plate body 32 of the connecting plate 3 is located between two opposite restrain plates 2, and symmetrical inclined gaps are provided between the restrain plates 2 and the connecting plates 3. The connecting plate 3 is slidable with respect to the core plate 1 under an external force. The restrain plate 2 is slidable with respect to the core plate 1 to restrain the out-of-plane deformation of the core plate 1. Due to the provision of symmetrical inclined gaps between the connecting plates 3 and the restrain plates 2, the core plate 1 is provided with good deformability, and a buckling between the gaps is less likely to happen when the core plate 1 is subjected to an axial pressure. As shown in FIGS. 1, 2, 4 and 6, the core plate 1 is provided with a first connecting hole 11, a second connecting hole 12 and a third connecting hole 13. The first connecting hole 11 is a round hole, and the second connecting hole 12 and the third connecting hole 13 are both an elongated hole. A length direction of the second connecting hole 12 is parallel to that of the third connecting hole 13. The length direction of the second connecting hole 12 and the third connecting hole 13 is parallel to a length direction of the core plate 1. The first connecting holes 11 are symmetrically provided on two ends of the core plate 1.

The second plate body 32 is connected to an end of a first plate body 31 of the connecting plate 3. The connecting plate 3 is a funnel-shape steel plate with bolt holes and holes 6 for connection with external devices. The second plate body 32 is of a rectangular shape. A width of an end of the first plate body 31 connected with the second plate body 32 gradually decreases to a width of the second plate body 32, such that the first plate body 31 and the second plate body 32 together to form a funnel shape.

A first fastener 41 is configured to pass through the first connecting hole 11 to connect the first plate bodies 31 on two sides of the core plate 1 with the core plate 1. The first connecting hole 11 is a round hole, and an inner diameter of the first connecting hole 11 fits an outer diameter the first fastener 41, so that the first plate body 31 is unmovable with respect to the core plate 1. The first fastener 41 is a high-strength friction bolt, which provides a large preload to restrain the core plate 1, so that the first plate body 31 is unmovable with respect to the core plate 1 due to the large friction (fasten force) between the first plate body 31 and the core plate 1. In this case, the connecting plates 3 can transmit the external force applied thereon to the core plate 1.

A second fastener 42 is configured to pass through the second connecting hole 12 to detachably connect the second plate bodies 32 on different sides of the core plate 1 with the core plate 1. The second plate body 32 is arranged between two opposite restrain plates 2, so that symmetrical inclined gaps are formed between the restrain plates 2 and the portion of the first plate body 31 connecting with the second plate body 32. A gap is provided between the second connecting hole 12 and the second fastener 42 passing therethrough, and a width of the gap is larger than a maximum displacement of the core plate 1, so that when subjected to a force transmitted from the first plate body 31, the second plate body 32 is slidable in the second connecting hole 12 through the second fastener 42. The second fastener 42 is a normal bolt.

A third fastener 43 is configured to pass through the third connecting hole 12 to detachably connect the restrain plates 2 on different sides of the core plate 1 with the core plate 1. A gap is provided between the third connecting hole 13 and the third fastener 43 passing therethrough, and a width of the gap is larger than a maximum displacement of the core plate 1, so that when the core plate 1 is deformed, the restrain plate 2 is slidable with respect to the core plate 1 through the third fastener 43 in the third connecting hole 13 to inhibit the out-of-plane deformation of the core plate 1 (such as the bending or torsion deformation under the axial force). Based on the synergy of the connecting plate 3 and the restrain plate 2, the core plate is provided with a good deformability, so that a buckling between the gaps is less likely to happen to the core plate 1. The third fastener 43 is a normal bolt.

As mentioned above, when the first plate body 31 is subjected to an external force, the relative sliding will not occur between the first plate 31 and the core plate 1 due to the large friction (fastening force) therebetween. The external force first acts on the connecting plate 3, and the connecting plate 3 transmits the force to the core plate 1. Then the second plate body 32 slides downward with respect to the second connecting hole 12 through the second fastener 42. Since a certain distortion happens to the core plate 1, the restrain plate 2 slides with respect to the third connecting hole 13 through the third fastener 43. At this time, the restrain plate 2 only limits the out-of-plane deformation of the core plate 1 without limiting its axial deformation. When the core plate 1 experiences a deformation, the restrain plate 2 does not suffer an axial force, so that the plastic deformation is concentrated on the core plate 1 to limit the torsion of the core plate 1. Through the synergy of the connecting plate 3 and the restrain plate 2, a buckling between the gaps is less likely to happen to the core plate 1.

As used herein, the high-strength bolt is a grade 9.8 bolt, a grade 10.9 bolt or a bolt with a higher grade.

Figure 3:
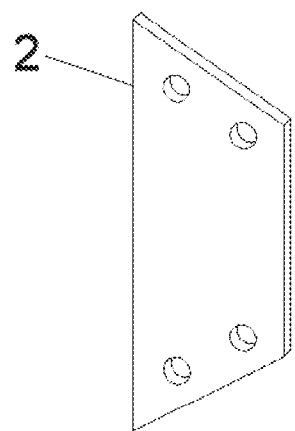
FIG. 3 is a schematic diagram of a structure of a restrain plate of the damper according to an embodiment of the present disclosure.
Figure 4:
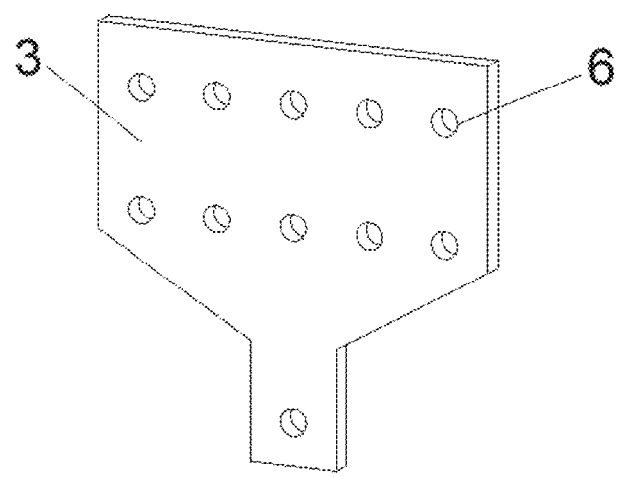
FIG. 4 schematically shows a structure of a connecting plate of the damper according to embodiment of the disclosure.

The restrain plate 2 is a steel plate provided with bolt holes. The connecting plate 3 is a steel plate provided with bolt holes and holes 6 for connection with external devices. The core plate 1 is an energy-dissipation steel plate. As shown in FIGS. 1, 3 and 4, a longitudinal section of the restrain plate 2 is of an isosceles trapezoid shape. A length direction of a bottom surface of the restrain plate 2 is parallel to a length direction of the core plate 1. The second plate body 32 is arranged between two restrain plates 2. Two inclined planes respectively parallel to waist surfaces of the two restrain plates 2 are provided on two sides of the first plate body 31, and a gap is provided between the inclined plane and the corresponding waist surface of the restrain plate 2 to provide a space for deformation. A width of the inclined gap between the restrain plate 2 and the connecting plate 3 is larger than a maximum displacement of the core plate 1. A gap of 1-2 mm is provided between the restrain plate 2 and the second plate body 32.

Figure 5:
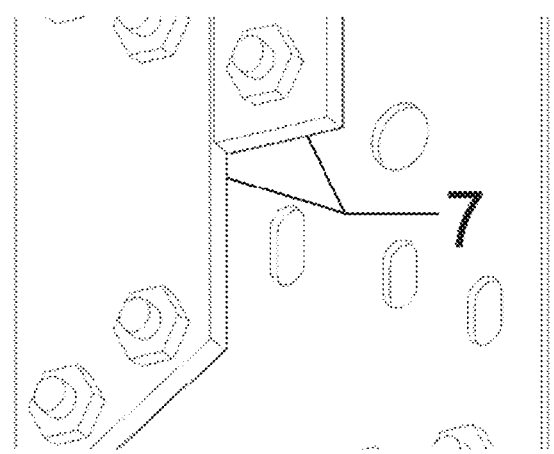
FIG. 5 schematically illustrates a position where the non-adhesive material is applied in the damper according to an embodiment of the disclosure.

As shown in FIG. 5, an inner surface (the surface facing towards the core plate 1) of the restrain plate 2 and an inner surface (the surface facing towards the core plate 1) of the second plate body 32 are both coated with a layer of a non-cohesive material 7. The non-cohesive material 7 can reduce the friction between the inner surface of the restrain plate 2 and the core plate 1 and the friction between the inner surface of the second plate body 32 and the core plate 1, avoiding influencing the hysteretic performance of the core plate 1 due to the large friction and reducing an influence of the friction on the tension and compression performance of the core plate 1.

In the embodiment, the non-cohesive material 7 can be butyl rubber or other materials with weak adhesion.

Figure 2:
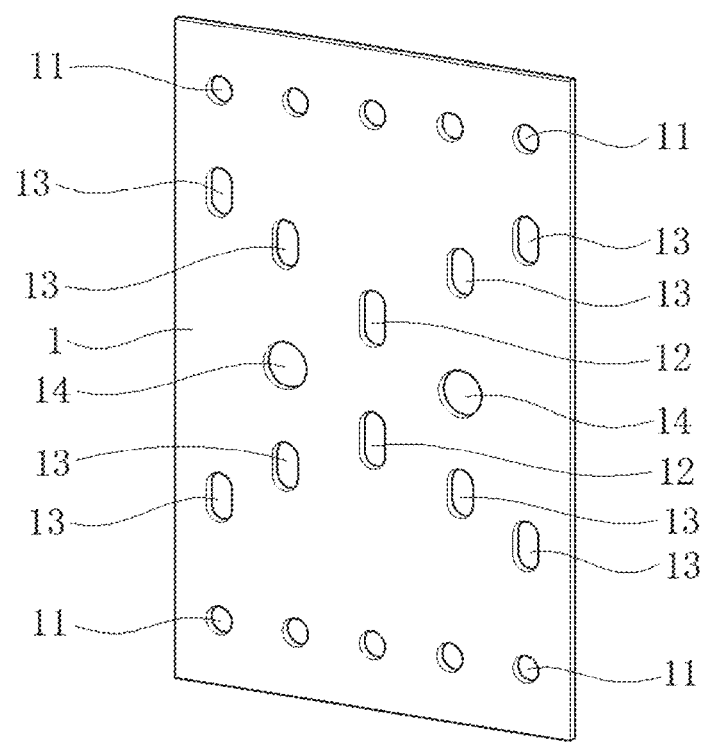
FIG. 2 schematically illustrates a structure of a core plate of the damper according to an embodiment of the disclosure.
Figure 6:
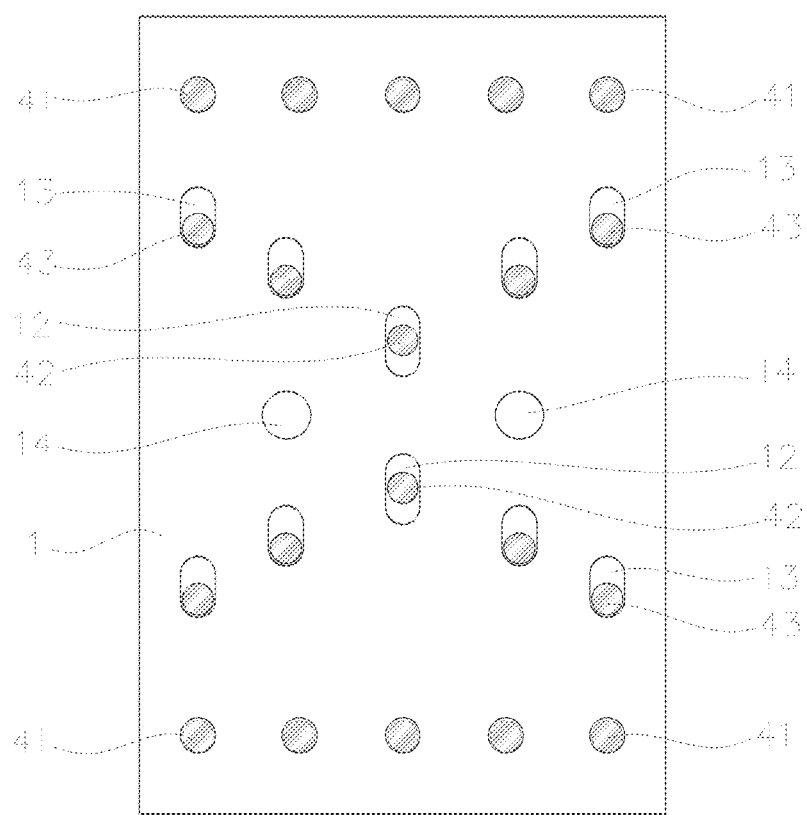
FIG. 6 is a schematic diagram of an internal structure of the damper according to an embodiment of the disclosure.

As shown in FIGS. 2 and 6, a through hole 14 is provided at a middle of the core plate 1 to weaken strength of the core plate 1, and the through hole 14 is round and is not used for a bolt to pass through. The round through hole 14 together with the elongated second connecting hole 12 and the elongated third connecting hole 13 weakens the strength of the core plate 1, such that a yield area of the core plate 1 is constricted in its middle region, providing the core plate 1 with satisfactory energy-dissipation capacity. As used herein, the core plate 1 can be made of steel LY100, LY160 or Q235B.

In an embodiment, the restrain plate 2 and the connecting plate 3 are made of Q345 steel, Q390 steel or Q420 steel. The restrain plate 2 and the connecting plate 3 must be larger than the core plate 1 in the strength, and a thickness of the restrain plate 2 and the connecting plate 3 should be not less than 2.5 times a thickness of the core plate 1.

Figure 7:
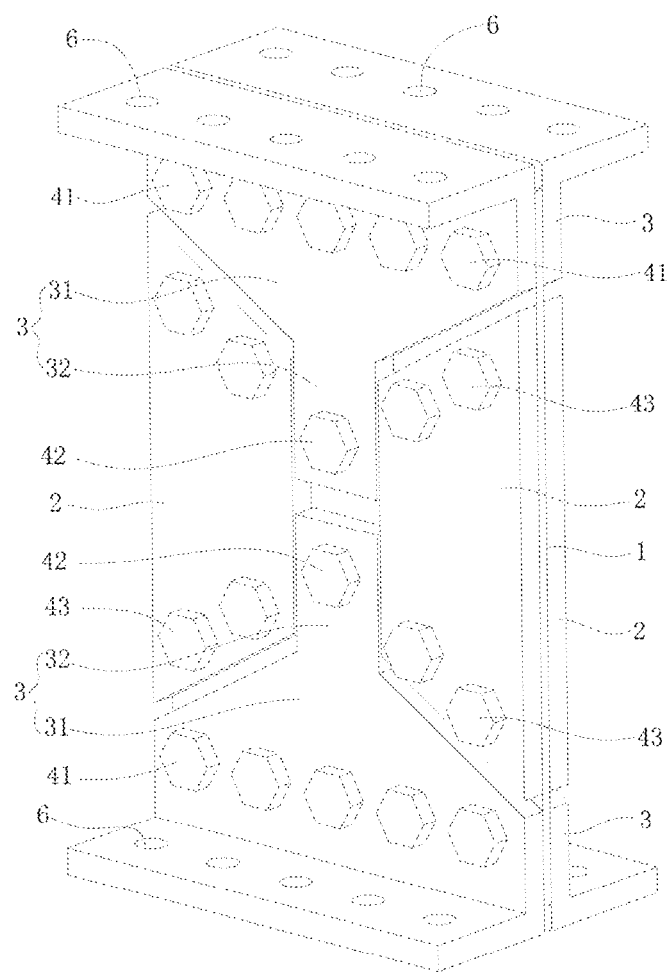
FIG. 7 is a schematic diagram of a structure of a damper for energy dissipation according to another embodiment of the disclosure.

As shown in FIGS. 1 and 4, the connecting plate 3 can be provided with several parts for connection with external devices, and the parts can be expanded into a shape corresponding to a specific external device. As shown in FIG. 7, an angle steel is exemplarily used the part for connection with the external apparatus.

Figure 8:
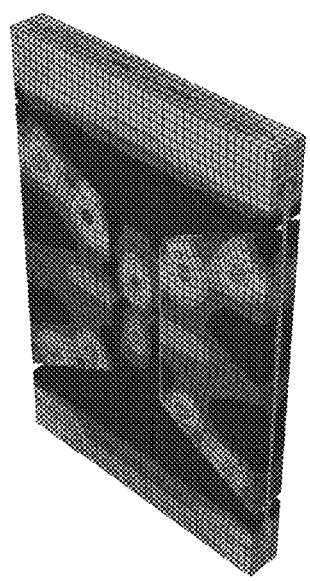
FIG. 8 schematically depicts a deformation of the damper under an external force according to an embodiment of the disclosure.
Figure 9:
FIG. 9 schematically shows the buckling of a core plate in FIG. 8.

The restrain plate 2 of a trapezoidal shape is numerically analyzed through a finite element method. As shown in FIGS. 8-9, the core plate 1 has a strength grade of Q235B, a thickness of 4 mm and a cross section of 270*410 mm. The core plate 1 is analyzed through displacement loading. It can be seen that the core plate 1 only experiences little buckling deformation. Therefore, the trapezoidal restrain plate 2 not only maintains a sufficient deformability of the core plate 1, but also effectively prevents the buckling of the core plate 1 between the gaps.

Figure 10:
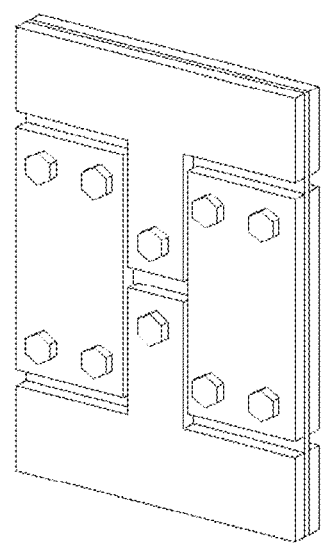
FIG. 10 shows a finite element model of a damper for energy dissipation with a rectangular restrain plate.
Figure 11:
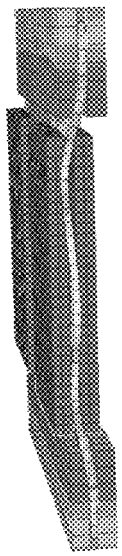
FIG. 11 schematically depicts the deformation of the damper with a rectangular restrain plate under the action of an external force.

If the restrain plate 2 is rectangular, the core plate 1 is more prone to out-of-plane buckling. FIG. 11 shows results of a finite element analysis of a damper shown in FIG. 10 in which a T-shaped connecting plate and a rectangular restrain plate are employed. A gap between the rectangular restrain plate and the T-shaped connecting plate is horizontal, and it can be observed that the core plate within the gap experiences obvious buckling, leading to an out-of-plane buckling at other areas.

Compared to the rectangular restrain plate, the trapezoidal restrain plate used herein exhibits better performance. Since the core plate 1 dissipates energy through the tension and compression yield, a certain gap needs to be provided between the restrain plate 2 and the connecting plate 3 to ensure that the core plate 1 has a sufficient deformability. In addition, a direction of the gap also largely influences the buckling extent of the core plate 1. The upper and lower inclined planes of the restrain plate 2 prevent the buckling from happening to the core plate 1 within the gaps when subjected to an axial force.

Figure 12:
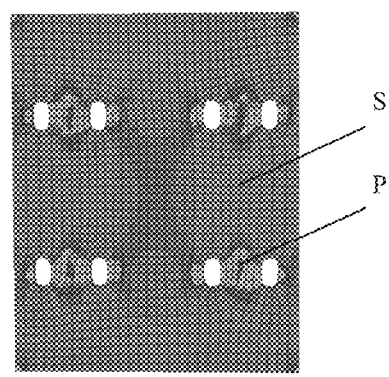
FIG. 12 schematically shows an initial yield of a damper for energy dissipation in which the holes are arranged in the first way.
Figure 13:
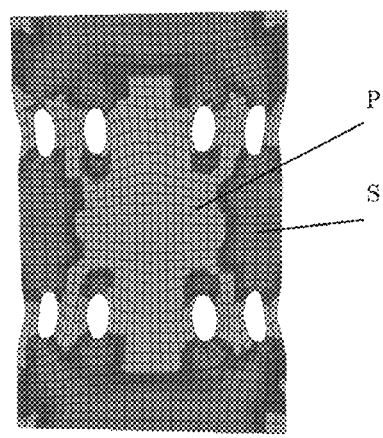
FIG. 13 schematically shows a final yield of a damper for energy dissipation in which the holes are arranged in the first way.
Figure 14:
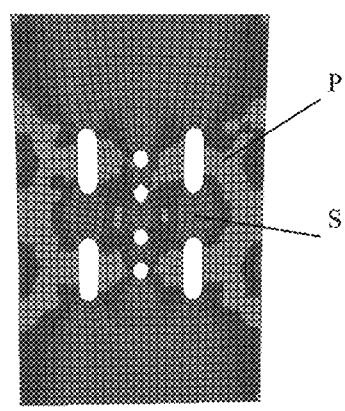
FIG. 14 schematically illustrates a final yield of a damper for energy dissipation in which the holes are arranged in the second way.

Furthermore, the arrangement of holes on the core plate 1 also influences the energy dissipation of the damper. As shown in FIGS. 12-13, the holes are merely provided at ⅓ of a length of the core plate 1. The initial yield point is located at the hole (P point; a lighter area is a yield area), which will influence a position of a yield plane of the core plate 1. As the load increases, when an ultimate strength has been reached at the hole, the middle of the core plate 1 (S point in the figures, a darker area is an unyielding area) is still not totally yielded. In addition, as shown in FIG. 14, the improper arrangement of holes seriously weakens cross-sections on both sides of a central axis, and the cross-sections are only partially yielded, so that it still fails to fully utilize the performance of the material.

Figure 15:
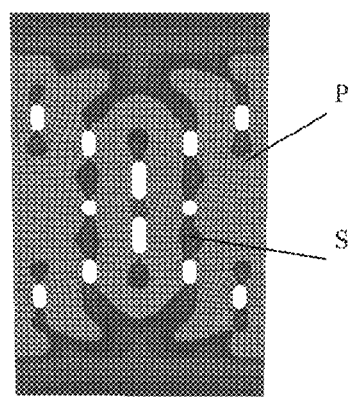
FIG. 15 schematically illustrates a final yield of a core plate of the damper according to an embodiment of the disclosure.

As provided herein, in addition to the elongated holes for connection between the core plate 1 and the restrain plate 2 and connection between the core plate 1 and the connecting plate 3, the core plate 1 is also provided with a through hole 14 at its central axis to weaken its strength. The elongated holes can also play a role in weakening the strength of the core plate 1. FIG. 15 schematically shows the yield part at the surface of the core plate 1, from which it can be seen that except for upper and lower sides of the holes, the remaining parts of the surface of the core plate 1 are all in a yielding state, and the yield regions are evenly distributed, which indicates that the core plate 1 is fully used for energy dissipation.

What is claimed is:

1. A damper for energy dissipation, comprising:
   a core plate;
   at least four restrain plates; and
   at least four connecting plates;
   wherein one end of the core plate is provided with at least two of the at least four connecting plates, and the other end of the core plate is provided with at least two of the at least four connecting plates; and the at least four restrain plates are provided on a middle of the core plate;
   the core plate is provided with a plurality of first connecting holes, a plurality of second connecting holes and a plurality of third connecting holes; each of the at least four connecting plates comprises a first plate body and a second plate body connected to an end of the first plate body; each of a plurality of first fasteners is configured to pass through each of the plurality of first connecting holes to connect the first plate body with the core plate; each of a plurality of second fasteners is configured to pass through each of the plurality of second connecting holes to connect the second plate body with the core plate; each of a plurality of third fasteners is configured to pass through each of the plurality of third connecting holes to connect each of the at least four restrain plates with the core plate; the second plate body is located between two opposite restrain plates; and symmetrical inclined gaps are provided between the at least four restrain plates and the at least four connecting plates;
   the at least four connecting plates are slidable with respect to the core plate under an external force; and the at least four restrain plates are slidable with respect to the core plate to restrain an out-of-plane deformation of the core plate.

2. The damper of claim 1, wherein each of the plurality of first connecting holes is a round hole; each of the plurality of second connecting holes and each of the plurality of third connecting holes are elongated holes; and an extension direction of the plurality of second connecting holes is the same as that of the plurality of third connecting holes.

3. The damper of claim 1, wherein the plurality of first fasteners, the plurality of second fasteners, and the plurality of third fasteners are all bolts.

4. The damper of claim 1, wherein an inner surface of each of the at least four restrain plates and an inner surface of the second plate body are both coated with a layer of a non-cohesive material.

5. The damper of claim 1, wherein four restrain plates and four connecting plates are provided; two of the four connecting plates are symmetrically arranged at two ends of a side of the core plate; the other two of the four connecting plates are symmetrically arranged at two ends of the other side of the core plate; the two of the four connecting plates at one side of the core plate and the other two of the four connecting plates at the other side of the core plate are provided in mirror symmetry; two of the four restrain plates are symmetrically arranged at a middle of one side of the core plate; the other two of the four restrain plates are symmetrically arranged at a middle of the other side of the core plate; and the two of the four restrain plates at one side of the core plate and the other two of the four restrain plates at the other side of the core plate are provided in mirror symmetry.

6. The damper of claim 1, wherein a longitudinal section of each of the at least four restrain plates is of an isosceles trapezoid shape; a length direction of a bottom surface of each of the at least four restrain plates is parallel to a length direction of the core plate; two inclined planes are respectively provided at two sides of the first plate body, and are parallel to waist surfaces of the two opposite restrain plates, respectively; and a gap is provided between each of the inclined planes and a waist surface of the corresponding restrain plate.

7. The damper of claim 1, wherein the core plate is an energy-dissipation steel plate; and the at least four restrain plates are made of steel.

* * * * *